Oct. 11, 1927.
C. W. HAZELETT
1,645,424
PROCESS OF MAKING STORAGE BATTERIES
Filed Feb. 21, 1921   3 Sheets-Sheet 2
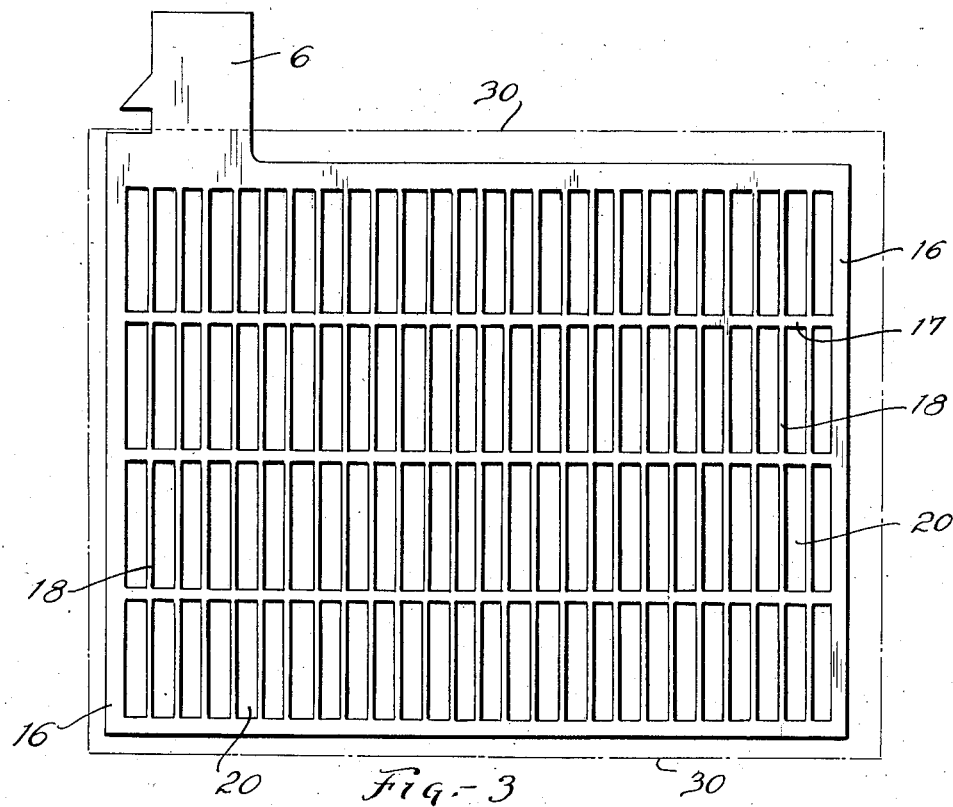
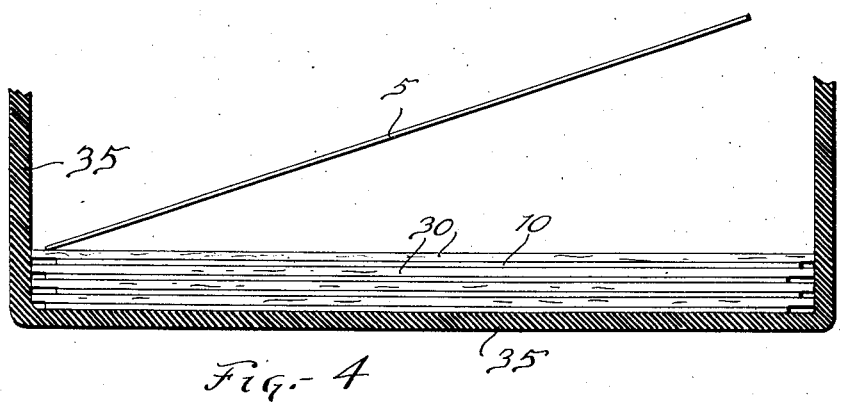

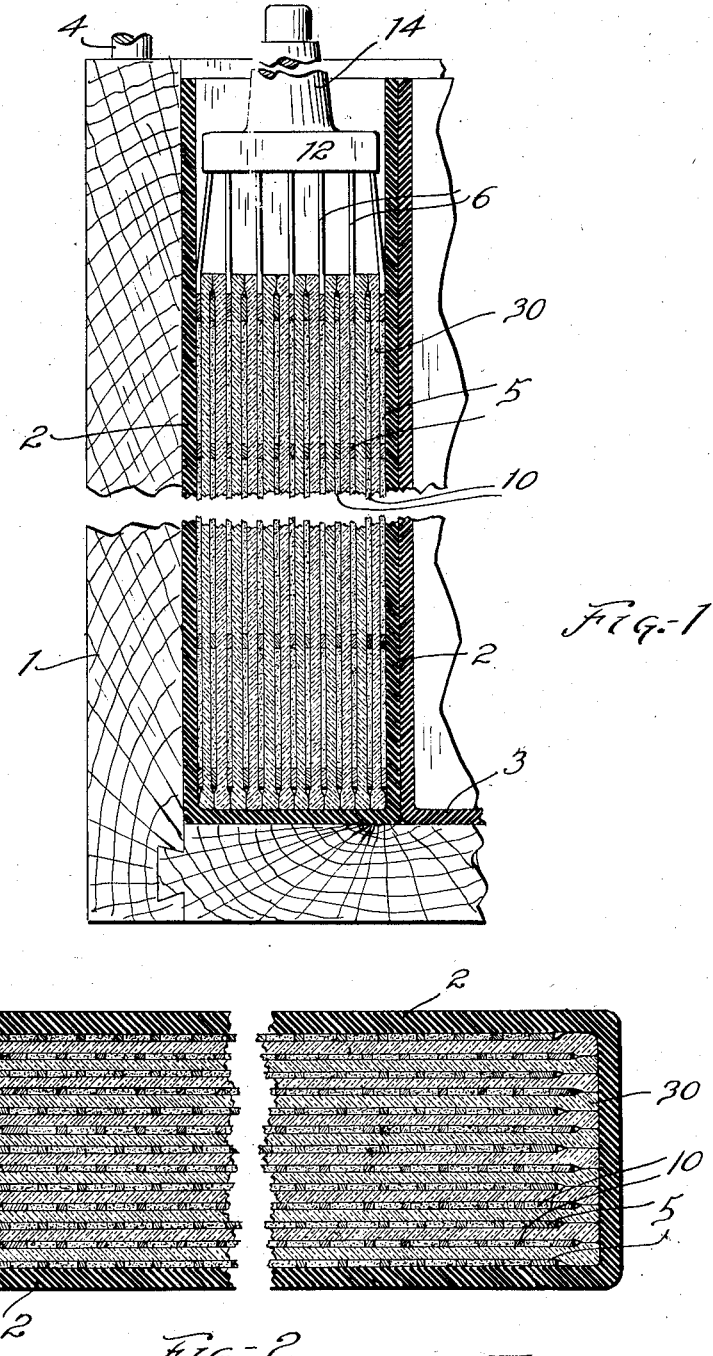

Oct. 11, 1927.
C. W. HAZELETT
1,645,424
PROCESS OF MAKING STORAGE BATTERIES
Filed Feb. 21, 1921  3 Sheets-Sheet 3
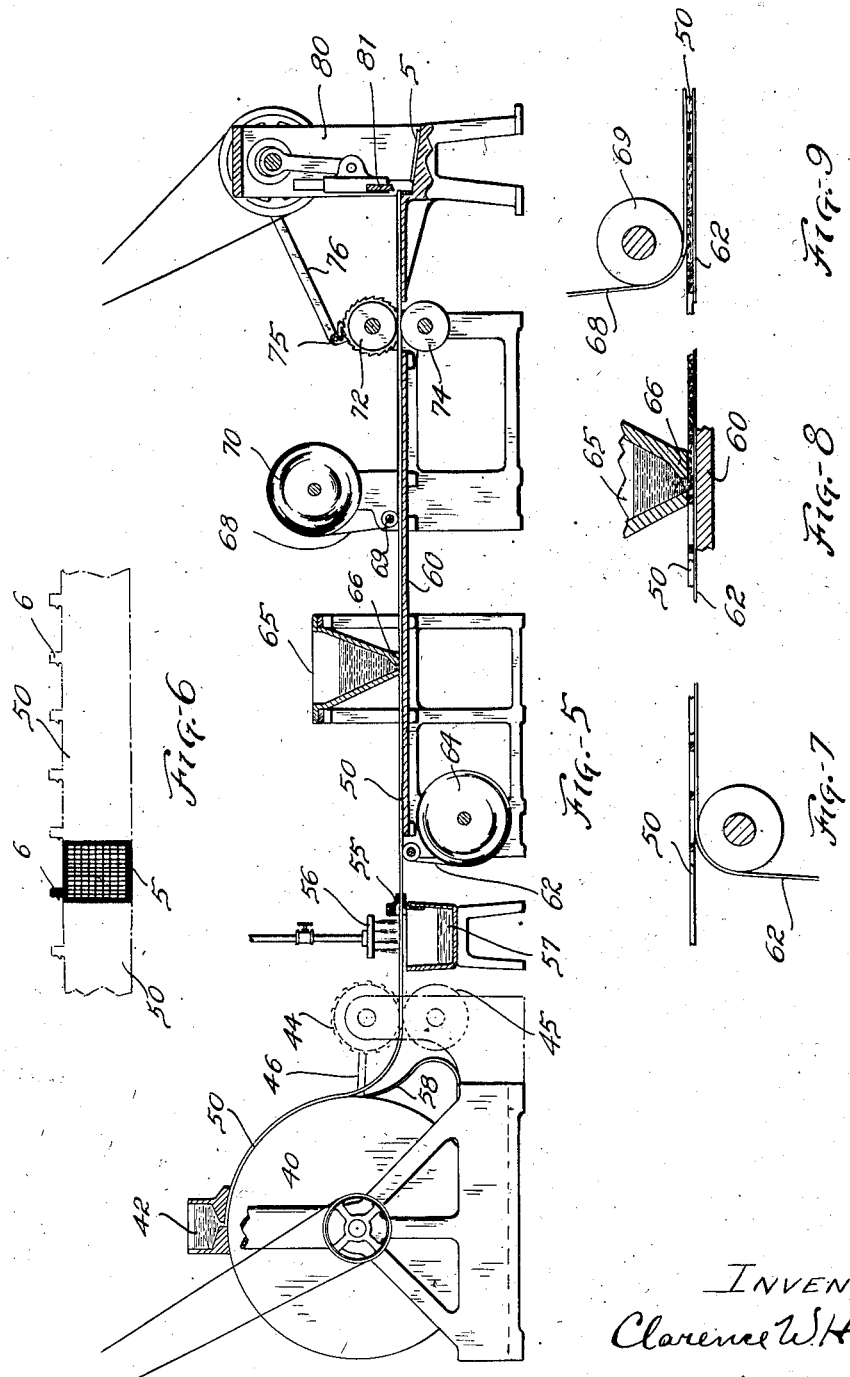
INVENTOR
Clarence W Hazelett,
By Bates & Macklin,
ATTORNEYS Patented Oct. 11, 1927.

1,645,424

UNITED STATES PATENT OFFICE.

CLARENCE W. HAZELETT, OF LAKEWOOD, OHIO, ASSIGNOR, BY MESNE ASSIGNMENTS, TO THE CLEVELAND TRUST COMPANY, TRUSTEE, OF CLEVELAND, OHIO.

PROCESS OF MAKING STORAGE BATTERIES.

Application filed February 21, 1921. Serial No. 446,768.

This invention relates to a process of manufacturing storage batteries, the general objects being economy of material, simplicity in assembly and the various steps of manufacture. The process is particularly concerned with the manufacture of batteries of the general nature of that shown, described and claimed in my co-pending application filed February 21, 1921, Serial No. 446,767. The present application is a continuation in part of my copending application filed September 27, 1919, Serial No. 423,309 and since lapsed.

Throughout the extensive manufacture of storage batteries of the type used for electrically propelled vehicles and on gasoline automobiles, for starting, lighting and ignition, it has been considered necessary in practice to make the battery plates in such form that they shall have retaining ribs or like elements, usually in staggered relation, to overhang and retain the paste while in use in the battery. It has accordingly been treated as commercially impractical and quite generally considered impossible to make plates thinner than one-eighth of an inch, because of the extreme difficulty of providing conformations and holding elements, formed on the plates themselves, for retaining the active material.

I have evolved a method of battery construction whereby the paste is effectively retained in the plates without holding means in the plates themselves, and I am accordingly enabled to manufacture plates of such extreme thinness that they may properly be referred to as "leaf-lead plates." I find it preferable to form these plates of crystalline or cast material, (at least for the positive elements) as rolled leaf-lead has a tendency to expand or grow longitudinally of the grain when in use in the battery.

Various specific objects are incident to the carrying out of my process, one of which is to overcome the difficulties of manufacturing sheet lead having characteristics suitable for use as grids in batteries.

Other features and characteristics will become apparent in the following description which relates to the drawings.

Fig. 1 is a transverse section through a cell of a battery constructed in accordance with my invention, the plane of the section being taken at right angles to the plane of the plates and separators; Fig. 2 is a horizontal section through such a cell; Fig. 3 is an enlarged side elevation of my improved plate or electrode, showing the preferred arrangement of the voids or perforations for the paste; Fig. 4 is a sectional view illustrating the method of laying up the plates and separators in a form; Fig. 5 is a partial sectional view conventionally illustrating mechanisms for casting the lead sheets or grids, cooling means, paste applying means, feeding and pressing rollers, and a shear for cutting the plates apart; Fig. 6 is a diagrammatical illustration of the strip of plates showing the relation of the plate to the strip; Fig. 7 shows the method of bringing a backing strip beneath the plate; Fig. 8 the mouth of the paste applying means, and Fig. 9 the arrangement for placing a protecting strip at the upper side of the plates.

My invention may be best understood by first describing a battery construction, produced by my process. The usual rigid battery box is indicated at 1, forming a container for a plurality of cell jars designated 2, each having side and end walls integral with the bottom walls 3, resting upon the bottom of the box; while 4 designates portions of the usual battery box handles. Within the cell jars are alternate positive and negative plates designated for convenience, 5 and 10, respectively, each having upwardly projecting terminal lugs as at 6, placed in contact, and autogenously welded to bridge bars 12, bearing the usual terminal lugs indicated at 14, forming the electrical terminals for the cell.

As previously stated, the plates are of very thin and of a crystalline material. As shown, these plates comprise essentially outer frame members 16, forming the perimeter of the grids, and strengthening cross bars 17 integrally connected by vertical thin strips or bars 18, leaving openings or perforations 20 for the paste or active material. In practice the relative dimensions of these parts may vary, but I have secured excellent results by making the sheets 1/32 inch in thickness, the outside frame members about 3/32 inch wide, while the perforations defined by the cross strips 17 and the bars 18 are about 1 inch high by 5/32 inch wide, the thin ribs being approximately 1/40th inch wide. The terminal lugs are continuations of the same thin strip or sheet integral with the upper portion of the frame of the grid.

The separators 30 are preferably plain sheets of fibrous material. I have secured excellent results by using paper approximately 1/25 inch in thickness, when dry, and cut to a size such that it projects beyond the perimeter of the grid slightly in all directions, as indicated particularly by the broken lines in Fig. 3. This paper gives excellent results when composed of approximately one-half wood pulp and one-half sulphite fibre.

Referring now to the process; in Figs. 5 to 9, 40 represents a revolving drum, on which is mounted a lead pot 42 and suitable means for maintaining the heating of the lead, as by electricity. Provision is made for cooling of the drum, so that the molten metal immediately congeals upon issuing from the mouth of the pot. On the surface of the drum may be gates, projections, cavities, etc., arranged to cast and form the grids described. By this means the grids are formed in a connected strip with the cross ribs and vertical bars as well as the terminal lugs completely defined and these grids need only to be severed. In the casting of very thin grids with certain alloys of lead more accurate results may be sometimes attained by the use of dies for perforating and cutting the grids from a continuous uniform sheet strip of lead flowing from the gate of the lead pot. Such dies may be of any suitable mechanical construction, preferably synchronized with the rotation of the drums. For example, I have illustrated, in broken lines, a rotary punch member 44 and a coacting platen 45, one of these members being connected by gearing and a shaft, indicated at 46, to the shaft of the drum 40. Thus in one case, strips of connected plates designated 50, in Figs. 7, 8 and 9, flow from the gate of the pot 42, follow the drum downwardly and lead through a guide 55 of cooling apparatus, consisting of a spray device 56, and a suitable receptacle 57. In the other case, namely, the punching operation, the strip 50 flowing from the gate is a flat sheet of cast lead which is formed by the shearing and punching action of the rolls 44 and 45 into the grids. A stripper 58 insures the separation of the strip of leaf lead, or the grids, from the surfaces of the drum.

A machine for casting thin lead sheets for this purpose is shown, described and claimed in my co-pending application No. 423,309, filed November 11, 1920, entitled Process and apparatus for casting sheet metal.

The strip of plates passes over guide 60, over which a strip of paper 62, leading from a roll 64, progresses with the plate, forming a backing of porous material beneath the strip of grids. The strip passes under the gate of a paste receptacle 65, having a lip 66 in close contact with the upper surfaces of the plates, acting to cause even filling of the openings by rubbing the paste flush with the upper side of the grid.

I desire to provide a thin sheet of paper or like material on each side of the plates, which may facilitate handling without danger of the active material falling away, i. e., these sheets of paper form films or retaining means. The strip 62 on one side, and the strip 68 on another side, led under a roll 69 from a roll 70. Thus as the strip 50 advances, the surplus moisture of the active material may be squeezed out between rolls 72—74. One of these rolls is shown as actuated by a ratchet and pawl connection indicated at 75, operated through an eccentric pin, not shown, on the fly wheel of a shear, indicated conventionally at 80, and connected by the link 76 leading to the ratchet arm. This shear may thus control the feeding of the strips and cause a movable knife indicated at 81 on a suitable vertical slide, to sever the individual plates from the strip 50. It is to be understood that this arrangement just described is merely illustrative of any suitable means for causing the shear to sever the strips along the proper line between the grids.

These plates may then be assembled to complete the battery.

The positive and negative plates are laid alternately in a suitable receptacle or guide, such as illustrated at 35 in Fig. 4, and it will be noted that they are slightly staggered, that is, the edges of the positive plates are nearer one side of the guide than the negative plates. While holding the plates and separators in this position, in a bundle as it were, they are placed in a suitable electrolyte and the paste rendered active by electrolysis, forming peroxide of lead in the positive grids and spongy lead in the negative grids, thus charging the cell.

The battery units are then placed in the jars 2, and the separators swelling by reason of the moisture cause these plates and separators to lie in intimate contact actually creating a pressure transversely of the plates, and as they swell outwardly past the edges of the plates they encounter the sides of the jars, resulting in spreading of the edges of the separators, thus entirely enclosing each plate of the battery, except the two outside plates. This feature results in most effective insulation of the plates, one from another, and when the jars are placed in the container or box 1, the support afforded by the sides of the box hold the somewhat flexible sides of the jar in parallelism, whereby this close contact of the plates and separators is maintained throughout the life of the battery, and relative movement of the plates or the shifting of the plates with relation to the jar is prevented.

It will be noted that the bottom or lower edges of the plates or grids are held somewhat above the bottoms of the jars by reason of the separators swelling as at the sides to form a complete support for each plate.

From the foregoing, it will be seen that the active material is applied to the grids, which are formed in a continuous strip, by reason of the mouth of the receptacle 65 being held in close contact to the upper surface of the lead strip, whereby the material is rubbed into the plates, and the excess scraped off by the lip 66. On account of the extreme thinness of the grids, the paste may be applied to the openings by feeding it entirely from one side, as no air will be trapped for two reasons; one being the thinness of the plates, and the other, the provision of the porous strip 62 beneath the plates. The strip 62 and the strip 68, placed on the upper side and of similar thin porous material (like news print paper), prevent the paste from adhering to the surfaces of the rolls 72 and 74. These rolls compress the paste somewhat, and squeeze out the surplus moisture, whereby, without any drying or soaking process these grids with their thin coatings of paper may be freely handled and assembled in the battery cells as described in connection with Fig. 4. That is, the plates with their thin paper coatings and the separators are arranged, positive and negative alternately, in a suitable guide box or like form as shown in Fig. 4, and the cell is then removed while held tightly together, as by a large rubber band or similar means, while the paste is rendered active by the usual electrolysis.

The provision of connections between the terminal lugs of the plates may be conveniently accomplished immediately after assembling the cell by bringing the comparatively flexible lugs 6 together, or a more satisfactory commercial product may be made by casting integrally with the lugs the usual bridge bars 12 carrying the terminal bosses as previously described.

In this connection it may be noted that because of the thinness of the plates considerable flexibility is afforded to these lugs, even though several of them are welded to a single bridge bar. By making these bridge bars slightly shorter than the width of the cell, as shown in Fig. 1, I have been able to provide for slight lateral movement of the terminal bosses, compensating for inaccuracies of the connector bars between the cells, and facilitating the final assembling and completion of the battery.

The use of the strips of paper on each side of the plate, in no way interferes with the electrolytic action of the battery, because of the extreme thinness and porous character of these strips, in fact they are so thin that no attempt is made to show them in the drawings other than the conventional views illustrating the process. Of course, they may be removed if desired, but I find it more practical to leave them adhering to the sides of the plate and thus holding the active material, and simply assemble them together with the usual separators.

In addition to the advantages of economy in the steps of the process of manufacture of a battery, I have accomplished still other advantages of considerable value, such, for example, as the elimination of expensive equipment and skilled labor. Highly skilled labor is required in making the thick grids and pasting them by hand, and the grooved separators incident to the thick grids are much more expensive than my plain, ungrooved type of separator which may be simply rectangular sheets of paper, preferably consisting of sulphite fibre and wood pulp. The thin lead leaf or similarly formed alloy effects at once a material saving in cost of the grids, and I have no difficulties resulting from the buckling or short circuiting of the plates while in use.

Various modifications may be made in my battery construction and process of manufacture without departing from the spirit of my invention.

Having thus described my invention, I claim:

1. The steps in the process of manufacturing storage batteries, consisting in placing porous separators between plates of opposite polarity, assembling said plates and separators in a container tightly fitting the same and maintaining contact of the separators with the active material of the plates, whereby the separators entirely fill the space between the plates and the active material, and then forming the paste into active material by electrolysis.

2. The steps in the process of manufacturing storage batteries consisting in placing porous separators between plates of opposite polarity, assembling said plates and separators into a group forming a cell, and maintaining contact of the separators with the active material of the plates on opposite sides thereof, and then forming the paste into active material by electrolysis while so assembled.

3. The steps in the process of manufacturing a storage battery of the pasted type, consisting in placing the grids upon porous separating material, applying the paste to the open upper sides of the grids and through the interstices thereof into contact with said separating material, then placing said separating material and pasted grids in a container without removing the separating material.

4. The steps in the process of manufacturing a storage battery of the pasted type, consisting in placing the grids upon porous separators, applying the paste to the open upper sides of the grids and through the interstices thereof into contact with the said separators, adding porous separators to the tops of said grids, and then placing the grids and separators in a container, whereby the paste cannot dislodge from the grid during handling and subsequent use of the battery.

5. The steps in the process of manufacturing storage batteries, consisting of placing plates of alternate polarity upon successive folds of a continuous strip of plain fibrous material, folding said strip first one way and then another across the successive plates, forming a cell, maintaining close contact of the folds of said strip with the plates, and forming the paste into active material by electrolysis.

6. A process of manufacturing storage batteries of the pasted type consisting of casting a sheet metal strip, mechanically forming perforations through it, supporting the strip horizontally on a strip of paper, applying paste to the upper side of the metal strip which passes through the perforations thereof, thereafter shearing the strip and paper, assembling plates so made, and forming them electrolytically.

In testimony whereof, I hereunto affix my signature.

CLARENCE W. HAZELETT.